United States Patent
Okumura et al.

(10) Patent No.: US 10,010,826 B2
(45) Date of Patent: Jul. 3, 2018

(54) CARBON DIOXIDE SEPARATION AND RECOVERY SYSTEM

(71) Applicant: KAWASAKI JUKOGYO KABUSHIKI KAISHA, Kobe-shi, Hyogo (JP)

(72) Inventors: Takeshi Okumura, Kakogawa (JP); Yoshiharu Nonaka, Kobe (JP); Tomoyuki Ogino, Kobe (JP); Shohei Nishibe, Akashi (JP); Takatoshi Shoji, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 9 days.

(21) Appl. No.: 15/127,592

(22) PCT Filed: Mar. 3, 2015

(86) PCT No.: PCT/JP2015/001103
§ 371 (c)(1),
(2) Date: Sep. 28, 2016

(87) PCT Pub. No.: WO2015/141158
PCT Pub. Date: Sep. 24, 2015

(65) Prior Publication Data
US 2017/0136404 A1    May 18, 2017

(30) Foreign Application Priority Data
Mar. 20, 2014    (JP) .................... 2014-057508

(51) Int. Cl.
*B01D 53/04*    (2006.01)
(52) U.S. Cl.
CPC .... *B01D 53/0438* (2013.01); *B01D 2257/504* (2013.01); *B01D 2259/4009* (2013.01)

(58) Field of Classification Search
CPC ...... B01D 2257/504; B01D 2259/4009; B01D 53/0438
See application file for complete search history.

(56) References Cited

U.S. PATENT DOCUMENTS

2014/0331864 A1*  11/2014  Ogino .................... B01D 53/08
                                                                       96/145

FOREIGN PATENT DOCUMENTS

| CN | 101024145 A    | 8/2007 |
| JP | 2013-121562 A  | 6/2013 |
| WO | 2013/084394 A1 | 6/2013 |

OTHER PUBLICATIONS

Apr. 7, 2015 International Search Report issued in International Patent Application No. PCT/JP2015/001103.

(Continued)

*Primary Examiner* — Cabrena Holecek
(74) *Attorney, Agent, or Firm* — Oliff PLC

(57) ABSTRACT

A carbon dioxide separation and recovery system includes an adsorption tower, a regeneration tower, and a drying tower. The adsorption tower causes a target gas to contact an adsorbent to adsorb carbon dioxide contained in the target gas to the adsorbent. The regeneration tower causes a normal-pressure wet gas which is a gas mixture of the carbon dioxide and steam to contact the adsorbent having adsorbed the carbon dioxide to desorb the carbon dioxide from the adsorbent. The drying tower dries the adsorbent. In addition, the carbon dioxide separation and recovery system includes a compressor that compresses the carbon dioxide, and an ejector that expands the carbon dioxide discharged from the compressor while suctioning negative-pressure steam, to generate the wet gas.

2 Claims, 4 Drawing Sheets

(56) References Cited

OTHER PUBLICATIONS

Apr. 7, 2015 Written Opinion issued in International Patent Application No. PCT/JP2015/001103.
Mar. 27, 2017 Office Action issued in Chinese Patent Application No. 201580006108.4.

* cited by examiner

CARBON DIOXIDE SEPARATION AND RECOVERY SYSTEM

TECHNICAL FIELD

The present invention relates to a carbon dioxide separation and recovery system which separates and recovers carbon dioxide from a target gas (gas to be treated) by use of a solid adsorbent.

BACKGROUND ART

Conventionally, a carbon dioxide separation and recovery system which separates and recovers carbon dioxide from a target gas by use of a solid adsorbent is known. For example, Patent Literature 1 discloses a carbon dioxide separation and recovery system 100 as shown in FIG. 3.

Specifically, in the carbon dioxide separation and recovery system 100 an adsorbent is transferred to a hopper 110, an adsorption tower 120, a regeneration tower 130, a drying tower 140, and a cooling tower 150 in this order. Also, the adsorbent is returned from the cooling tower 150 to the hopper 110 by a conveyor 160.

In the adsorption tower 120, a target gas is caused to contact the adsorbent, and carbon dioxide contained in the target gas is adsorbed to the adsorbent. Steam is supplied from the drying tower 140 to the regeneration tower 130. This steam is condensed on the adsorbent having adsorbed the carbon dioxide, and thereby the carbon dioxide is desorbed from the adsorbent. The desorbed carbon dioxide is suctioned into a recovery pump 170 through a carbon dioxide recovery path 135, compressed by the recovery pump 170, and then reserved in a carbon dioxide holder 180.

The drying tower 140 evaporates the condensed water adhering to the adsorbent by indirect heating. The steam generated by evaporating the condensed water is supplied to the regeneration tower 130 as the steam used for regenerating the adsorbent. For example, saturated steam (e.g., 60 degrees C.) having a negative pressure (about 20 kPa in an absolute pressure) in a gauge pressure is supplied to the drying tower 140 as a heat medium.

The drying tower 140 and the regeneration tower 130 constitute a tank having a unitary (integrated) construction. Therefore, each of the interior of the drying tower 140 and the interior of the regeneration tower 130 is adjusted to have a pressure (e.g., about 20 kPa) in which the heat medium allows the condensed water to be evaporated, by the suction operation of the recovery pump 170. For this reason, differential pressure holding devices (e.g., lock hoppers) for holding pressure differences with respect to an atmospheric pressure are provided at a location between the adsorption tower 120 and the regeneration tower 130 and a location between the drying tower 140 and the cooling tower 150, respectively.

CITATION LIST

Patent Literature

Patent Literature 1: Japanese-Laid Open Patent Application Publication No. 2013-121562

SUMMARY OF INVENTION

Technical Problem

In the carbon dioxide separation and recovery system 100 of FIG. 3, the negative-pressure saturated steam is used as the heat medium used for drying the adsorbent, in order to generate the steam used for regenerating the adsorbent, with low energy (e.g., waste heat having a temperature lower than 100 degrees C., which is exhausted from various equipment). However, in a case where the negative-pressure saturated steam is used as the heat medium, the differential pressure holding devices are required as described above.

In view of the above-described circumstances, an object of the present invention is to provide a carbon dioxide separation and recovery system which can regenerate an adsorbent, by utilizing steam having a low temperature (a temperature lower than than 100 degrees C.) and a negative pressure, which can be generated with low energy, and eliminate a need for a differential pressure holding device.

Solution to Problem

To achieve the above-described object, a carbon dioxide separation and recovery system of the present invention, which separates and recovers carbon dioxide from a target gas by use of a solid adsorbent, comprises an adsorption tower that causes the target gas to contact the adsorbent to adsorb the carbon dioxide contained in the target gas to the adsorbent, and discharges the target gas from which the carbon dioxide has been removed; a compressor that compresses the carbon dioxide; an ejector that expands the carbon dioxide discharged from the compressor while suctioning negative-pressure steam, to generate a normal-pressure wet gas; a regeneration tower that causes the wet gas ejected from the ejector to contact the adsorbent having adsorbed the carbon dioxide to desorb the carbon dioxide from the adsorbent, and discharges the desorbed carbon dioxide; and a drying tower that dries the adsorbent having contacted the wet gas.

The term "normal-pressure wet gas" is defined as a wet gas having a pressure (e.g., a pressure which is in a range of ±5% of an atmospheric pressure) which is substantially equal to the atmospheric pressure.

In accordance with the above-described configuration, since the normal-pressure wet gas is supplied to the regeneration tower, a differential pressure holding device for holding a pressure difference with respect to the atmospheric pressure need not be provided. In addition, the wet gas is generated by the ejector. Since the ejector suctions the negative-pressure steam, it can generate the wet gas used for regenerating the adsorbent, by utilizing the steam having a low temperature and a negative pressure, which can be generated with low energy. Further, even in a case where the temperature of the steam to be suctioned into the ejector is lower than 100 degrees C., high-temperature carbon dioxide having been compressed by the compressor is mixed with this steam. This makes it possible to easily generate the wet gas having a temperature of 100 degrees C. or higher. Moreover, since a component other than the steam, of the wet gas, is the carbon dioxide, the high-concentration carbon dioxide can be recovered by the regeneration tower.

The above-described carbon dioxide separation and recovery system may further comprise a return passage that leads to the compressor a part of the carbon dioxide discharged from the regeneration tower. In accordance with this configuration, waste heat exhausted from the regeneration tower can be efficiently utilized in generation of the wet gas.

Advantageous Effects of Invention

In accordance with the present invention, it becomes possible to provide a carbon dioxide separation and recovery system which can regenerate an adsorbent, by utilizing steam having a low temperature and a negative pressure, which can be generated with low energy, and eliminate a need for a differential pressure holding device.

DESCRIPTION OF EMBODIMENTS

A carbon dioxide separation and recovery system of the present invention separates and recovers carbon dioxide from a target gas (gas to be treated) by use of a solid adsorbent. The target gas is, for example, a combustion exhaust gas. The adsorbent is, for example, a granular porous material carrying an amine compound. As the porous material, active carbon, active alumina, or the like may be used. Hereinafter, the embodiments of the present invention will be described with reference to the drawings.

(Embodiment 1)

Figure 1:
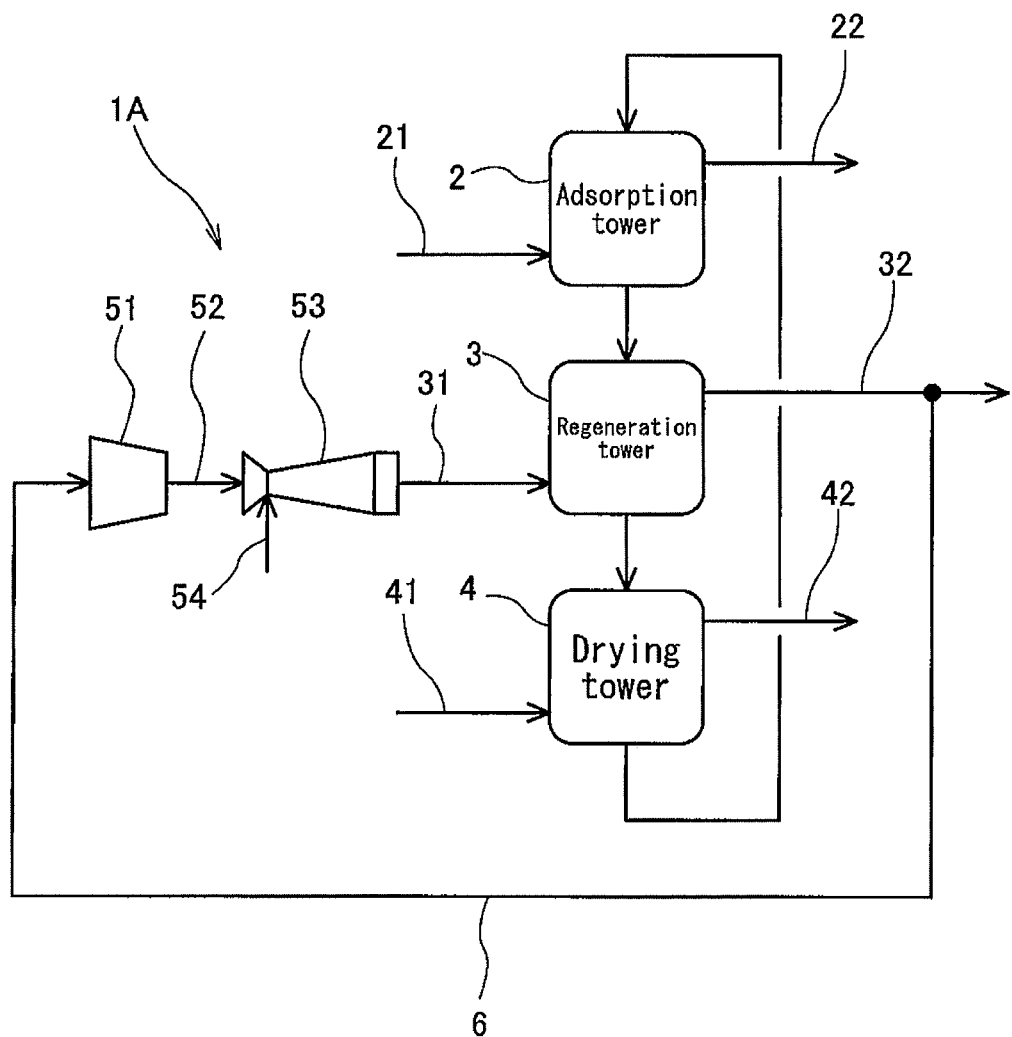
FIG. 1 is a schematic view showing the configuration of a carbon dioxide separation and recovery system according to Embodiment 1 of the present invention.

FIG. 1 shows a carbon dioxide separation and recovery system 1A according to Embodiment 1 of the present invention. The carbon dioxide separation and recovery system 1A is a system which uses the adsorbent of a moving bed in which the adsorbent is transferred to an adsorption tower 2, a regeneration tower 3, and a drying tower 4 in this order. The adsorbent is returned from the drying tower 4 to the adsorption tower 2 by a conveyor or the like (not shown). In other words, the adsorbent is circulated through the adsorption tower 2, the regeneration tower 3 and the drying tower 4.

In the present embodiment, the adsorption tower 2, the regeneration tower 3, and the drying tower 4 are arranged in this order from the top to the bottom. For example, each of the adsorption tower 2, the regeneration tower 3, and the drying tower 4 is constituted by a single tank. Transfer of the adsorbent from the adsorption tower 2 to the regeneration tower 3 and transfer of the adsorbent from the regeneration tower 3 to the drying tower 4 are performed successively by, for example, a gravitational force.

It should be noted that the configurations of the adsorption tower 2, the regeneration tower 3, and the drying tower 4 may be suitably changed. For example, two or all of the adsorption tower 2, the regeneration tower 3, and the drying tower 4 may constitute a tank having a unitary (integrated) construction. Further, the adsorption tower 2, the regeneration tower 3, and the drying tower 4 may be arranged horizontally to be independent of each other and the adsorbent is transferred to the adsorption tower 2, the regeneration tower 3, and the drying tower 4 in this order by a conveyor.

The adsorption tower 2 serves to cause the target gas to contact the adsorbent. Specifically, a target gas supply passage 21 is connected to the lower portion of the adsorption tower 2, and a target gas discharge passage 22 is connected to the upper portion of the adsorption tower 2. The target gas is supplied to the adsorption tower 2 through the target gas supply passage 21. Thereby, the carbon dioxide contained in the target gas is adsorbed to the adsorbent. The target gas from which the carbon dioxide has been removed, is discharged through the target gas discharge passage 22. The adsorbent having adsorbed the carbon dioxide is transferred to the regeneration tower 3.

For example, the temperature of the adsorbent being injected into the adsorption tower 2 is about 40 degrees C., while the temperature of the target gas supplied to the adsorption tower 2 is about 35 degrees C. The temperature of the adsorbent is slightly increased (e.g., up to about 60 degrees C.) as a result of the adsorption of the carbon dioxide to the adsorbent.

The regeneration tower 3 serves to cause a wet gas to contact the adsorbent. Specifically, a wet gas supply passage 31 is connected to the lower portion of the regeneration tower 3, and a carbon dioxide recovery passage 32 is connected to the upper portion of the regeneration tower 3. The wet gas having a normal (ordinary) pressure and a temperature of 100 degrees C. or higher is supplied to the regeneration tower 3 through the wet gas supply passage 31. The wet gas is a gas mixture of the carbon dioxide and the steam.

In the interior of the regeneration tower 3, the steam contained in the wet gas is condensed on the adsorbent, and the carbon dioxide is desorbed from the adsorbent. The amount of the steam contained in the wet gas is such that substantially the entire of the steam contained in the wet gas is condensed on the adsorbent. The carbon dioxide desorbed from the adsorbent and the carbon dioxide contained in the wet gas are discharged through the carbon dioxide recovery passage 32. The concentration of the carbon dioxide discharged through the carbon dioxide recovery passage 32 is approximately 100%. The adsorbent to which the condensed water adheres is transferred to the drying tower 4.

For example, the temperature of the wet gas supplied to the regeneration tower 3 is 100 degrees C. The temperature of the adsorbent is increased up to about 100 degrees C. due to the contact between the adsorbent and the wet gas, and the condensation of the steam of the wet gas on the adsorbent. Because of sensible heat and condensation heat provided to this adsorbent, the carbon dioxide is desorbed from the adsorbent.

The drying tower 4 serves to dry the adsorbent having contacted the wet gas. In the present embodiment, the drying tower 4 dries the adsorbent by direct heating in which a drying gas (gas used for drying the adsorbent) is caused to contact the adsorbent. Alternatively, the adsorbent may be dried by indirect heating in which a heat medium is flowed through a pipe inserted into the drying tower 4. As the heat medium used for the indirect heating, for example, the carbon dioxide discharged from the regeneration tower 3, the carbon dioxide having been compressed by a compressor 51 which will be described later, the wet gas before being supplied to the regeneration tower 3, or the like, may be used.

Specifically, a drying gas supply passage 41 is connected to the lower portion of the drying tower 4, and a drying gas discharge passage 42 is connected to the upper portion of the drying tower 4. The drying gas is supplied to the drying tower 4 through the drying gas supply passage 41. Thereby, the condensed water adhering to the adsorbent is evaporated. The steam generated by evaporating the condensed water is discharged together with the drying gas through the drying gas discharge passage 42. The adsorbent having been dried is returned to the adsorption tower 2.

For example, the temperature of the drying gas supplied to the drying tower 4 is about 80 degrees C. As drying of the adsorbent progresses, the temperature of the adsorbent is gradually reduced to the wet-bulb temperature of the drying gas, due to the evaporation of the condensed water adhering to the adsorbent. After that, the temperature of the adsorbent is maintained at the wet-bulb temperature of the drying gas during the evaporation of the condensed water. The above-described term "adsorbent having been dried" means the adsorbent just before the condensed water is completely evaporated, namely, the adsorbent maintained at a low temperature. It should be noted that a cooling tower may be provided between the drying tower 4 and the adsorption tower 2 in a case where the wet-bulb temperature of the drying gas is higher than the temperature (about 40 degrees C. in the above-described example) of the adsorbent being injected into the adsorption tower 2.

The upstream end of the above-described wet gas supply passage 31 is connected to an ejector 53. The ejector 53 is connected to the compressor 51 via a relay passage 52. Further, a return passage 6 which branches from the carbon dioxide recovery passage 32 is connected to the compressor 51.

The return passage 6 leads to the compressor 51 a part of the carbon dioxide discharged from the regeneration tower 3. The compressor 51 compresses this part of the carbon dioxide and discharges the compressed carbon dioxide. The carbon dioxide discharged from the compressor 51 is led to the ejector 53 through the relay passage 52.

The ejector 53 is connected to a steam supply source via a steam supply passage 54. The steam supply source is, for example, a turbine or a boiler which discharges negative-pressure steam. Or, the steam supply source may be a sealed container for reserving water. The ejector 53 expands the compressed carbon dioxide while suctioning the negative-pressure steam (saturated steam or superheated steam). In this way, the above-described normal-pressure wet gas is generated. The wet gas is ejected from the ejector 53 and led to the regeneration tower 3 through the wet gas supply passage 31.

For example, the carbon dioxide discharged from the compressor 51 has a pressure of about 410 kPa and a temperature of about 265 degrees C., while the steam to be suctioned into the ejector 53 is the saturated steam of about 7 kPa (about 40 degrees C.).

As should be understood from the foregoing description, in the carbon dioxide separation and recovery system 1A of the present embodiment, since the normal-pressure wet gas is supplied to the regeneration tower 3, a differential pressure holding device for holding a pressure difference with respect to an atmospheric pressure need not be provided. In addition, the wet gas is generated by the ejector 53. Since the ejector 53 suctions the negative-pressure steam, it can generate the wet gas used for regenerating the adsorbent, by utilizing the steam having the low temperature and the negative pressure, which can be generated with low energy. For example, in a case where the ejector 53 is connected to the sealed container for reserving the water, the wet gas can be generated only by the driving power of the compressor 51. Further, even in a case where the temperature of the steam to be suctioned into the ejector 53 is lower than 100 degrees C., the high-temperature carbon dioxide having been compressed by the compressor 51 is mixed with this steam. This makes it possible to easily generate the wet gas having a temperature of 100 degrees C. or higher. Moreover, since a component other than the steam, of the wet gas, is the carbon dioxide, high-concentration carbon dioxide can be recovered by the regeneration tower 3.

<Modified Example>

As described above, the configurations of the adsorption tower 2, the regeneration tower 3, and the drying tower 4 may be suitably changed. For example, the adsorption tower 2 may be disposed below the drying tower 4, and the adsorption tower 2 and the drying tower 4 may constitute a tank having a unitary construction. In other words, the lower portion of one tank may be the adsorption tower 2, and the upper portion of one tank may be the drying tower 4. In this case, by connecting the target gas supply passage 21 to the lower portion of the tank and connecting the target gas discharge passage 22 to the upper portion of the tank, the adsorbent to which the condensed water adheres can be dried, by utilizing the target gas from which the carbon dioxide has been removed.

(Embodiment 2)

Figure 2:
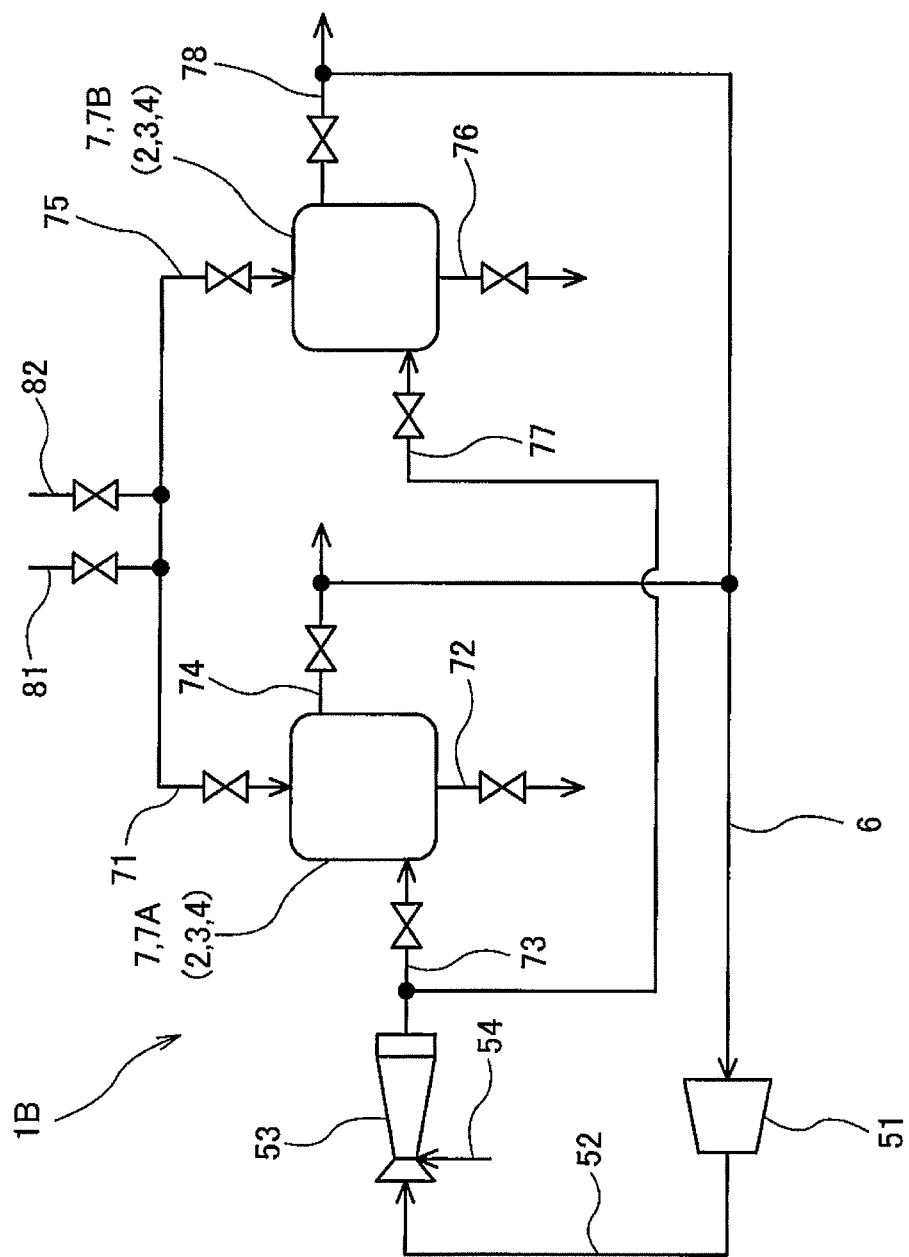
FIG. 2 is a schematic view showing the configuration of a carbon dioxide separation and recovery system according to Embodiment 2 of the present invention.
Figure 3:
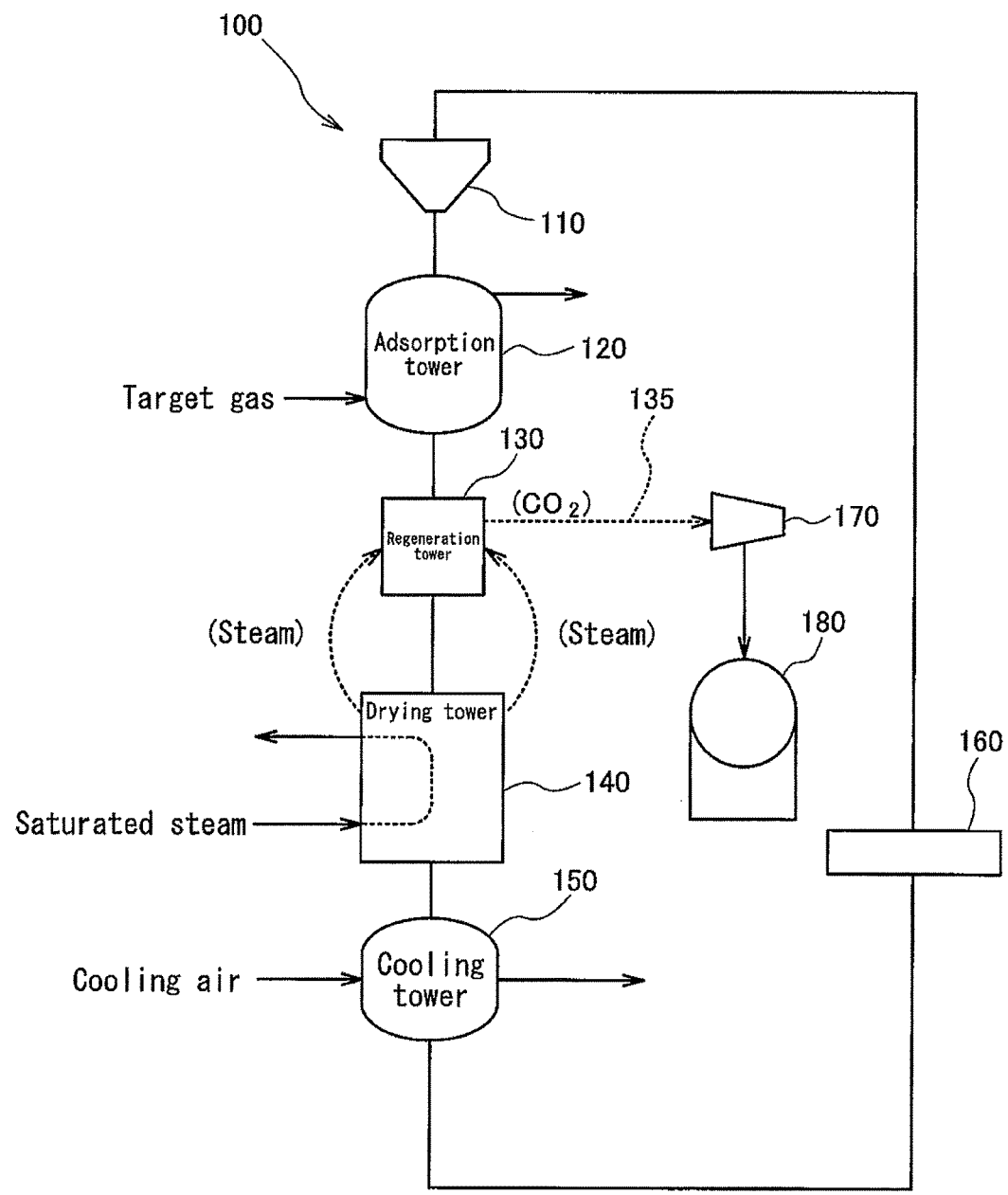
FIG. 3 is a schematic view showing the configuration of a conventional carbon dioxide separation and recovery system.
Figure 4:
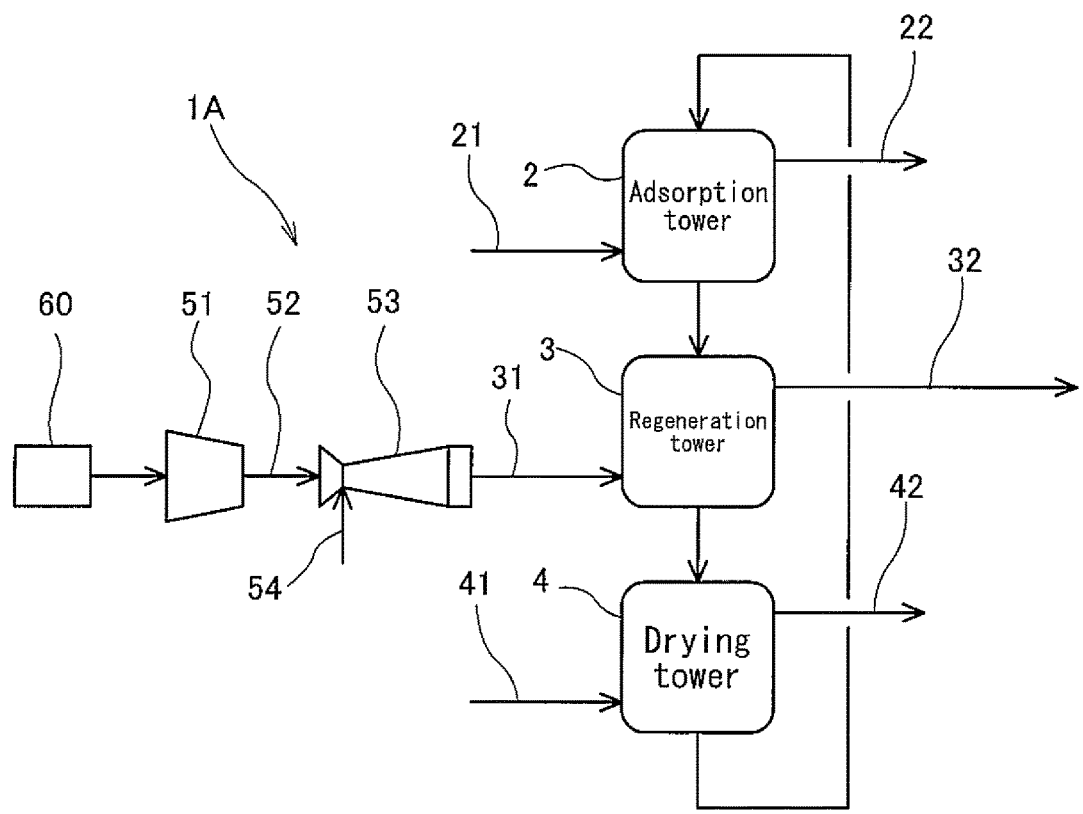
FIG. 4 is a schematic view showing the configuration of a carbon dioxide separation and recovery system according to another embodiment of the present invention.

Next, a carbon dioxide separation and recovery system 1B according to Embodiment 2 of the present invention will be described with reference to FIG. 2. In the present embodiment, the same components as those of Embodiment 1 are designated by the same reference symbols, and will not be described repeatedly.

The carbon dioxide separation and recovery system 1B of the present embodiment is a system which uses the adsorbent of a fixed bed, in which one tank 7 packed with the adsorbent functions as the adsorption tower 2, the regeneration tower 3, or the drying tower 4 in an adsorption stroke, a regeneration stroke, or a drying stroke, respectively. In the present embodiment, to enable successive treatment to be performed, two tanks 7 are provided. It should be noted that the number of the tanks 7 may be three or more. Further, to enable intermittent treatment to be performed, only one tank 7 may be provided. For easier understanding of the description, hereinafter, one of the two tanks 7 will be referred to as a first tank 7A and the other of the two tanks 7 will be referred to as a second tank 7B.

Specifically, a first common supply passage 71, a first common discharge passage 72, a first wet gas supply passage 73, and a first carbon dioxide recovery passage 74 are connected to the first tank 7A. In the same manner, a second common supply passage 75, a second common discharge passage 76, a second wet gas supply passage 77, and a second carbon dioxide recovery passage 78 are connected to the second tank 7B. These passages 71 to 78 are provided with on-off valves, respectively.

A portion of the first common supply passage 71 which is located upstream of the corresponding on-off valve and a portion of the second common supply passage 75 which is located upstream of the corresponding on-off valve are merged into one passage. A target gas supply passage 81 and a drying gas supply passage 82 are connected to the merged passage. The supply passages 81, 82 are also provided with on-off valves, respectively. In this configuration, the target gas or the drying gas can be selectively flowed through each of the first common supply passage 71 and the second common supply passage 75.

A portion of the first wet gas supply passage 73 which is located upstream of the corresponding on-off valve and a portion of the second wet gas supply passage 77 which is located upstream of the corresponding on-off valve are merged into one passage. The ejector 53 is connected to the merged passage. In this configuration, the normal-pressure wet gas ejected from the ejector 53 can be selectively supplied to either the first tank 7A or the second tank 7B.

Further, in the present embodiment, the upstream portion of the return passage 6 branches into two lines, which are connected to a portion of the first carbon dioxide recovery passage 74 which is located downstream of the corresponding on-off valve and a portion of the second carbon dioxide recovery passage 78 which is located downstream of the corresponding on-off valve, respectively. In this configuration, either the carbon dioxide discharged from the first tank 7A or the carbon dioxide discharged from the second tank 7B can be selected as the carbon dioxide to be led to the compressor 51 through the return passage 6.

In the above-described configuration, the on-off valves are operated so that while performing regeneration of the adsorbent in one of the tanks 7, adsorption of the carbon dioxide to the adsorbent and drying of the adsorbent can be performed in the other of the tanks 7. In this configuration, also, advantages similar to those of Embodiment 1 can be obtained by use of the compressor 51 and the ejector 53.

(Other Embodiment)

In Embodiment 1 and Embodiment 2, the return passage 6 leads to the compressor 51 a part of the carbon dioxide discharged from the regeneration tower 3 (one of the tanks 7 in Embodiment 2). Alternatively, the return passage 6 may be omitted. For example, the compressor 51 may be connected to a pressure container 60 packed with the carbon dioxide. Nonetheless, in the configuration in which the return passage 6 is provided like the configurations of Embodiment 1 and Embodiment 2, the waste heat exhausted from the regeneration tower 3 can be utilized efficiently in generation of the wet gas.

INDUSTRIAL APPLICABILITY

The present invention is useful in, for example, treatment of a combustion exhaust gas.

REFERENCE SIGNS LIST 1A, 1B carbon dioxide separation and recovery system
2 adsorption tower
3 regeneration tower
4 drying tower
51 compressor
53 ejector
6 return passage

The invention claimed is:

1. A carbon dioxide separation and recovery system which separates and recovers carbon dioxide from a target gas by use of a solid adsorbent, the system comprising:
   an adsorption tower that causes the target gas to contact the solid adsorbent to adsorb the carbon dioxide contained in the target gas to the adsorbent, and discharges the target gas from which the carbon dioxide has been removed;
   a compressor connected to a pressure container containing carbon dioxide and that supplies the carbon dioxide therein to the compressor, wherein the compressor compresses the carbon dioxide;
   an ejector that expands the carbon dioxide discharged from the compressor while suctioning negative-pressure steam, to generate wet gas that is a normal-pressure wet gas;
   a regeneration tower that causes the wet gas ejected from the ejector to contact the adsorbent having adsorbed the carbon dioxide to desorb the carbon dioxide from the adsorbent, and discharges the desorbed carbon dioxide; and
   a drying tower that dries the adsorbent having contacted the wet gas.

2. A carbon dioxide separation and recovery system which separates and recovers carbon dioxide from a target gas by use of a solid adsorbent, the system comprising:
   an adsorption tower that causes the target gas to contact the solid adsorbent to adsorb the carbon dioxide contained in the target gas to the adsorbent, and discharges the target gas from which the carbon dioxide has been removed;
   a regeneration tower that causes wet gas to contact the adsorbent having adsorbed the carbon dioxide to desorb the carbon dioxide from the adsorbent, and discharges the desorbed carbon dioxide;
   a return passage that returns a part of the desorbed carbon dioxide discharged from the regeneration tower to a compressor that compresses the carbon dioxide;
   an ejector that expands the carbon dioxide discharged from the compressor while suctioning negative-pressure steam, to generate the wet gas that is a normal-pressure wet gas; and
   a drying tower that dries the adsorbent having contacted the wet gas.

* * * * *